United States Patent [19]

Newman

[11] 3,896,214

[45] July 22, 1975

[54] PROCESS FOR REMOVING SULFUR DIOXIDE FROM GASES

[75] Inventor: Jacques Newman, Houston, Tex.

[73] Assignee: Thermotics, Inc., Houston, Tex.

[22] Filed: Sept. 5, 1972

[21] Appl. No.: 286,449

[52] U.S. Cl. ............... 423/242; 423/166; 423/512; 423/643
[51] Int. Cl............................................. C01b 17/00
[58] Field of Search ........................ 423/242–244, 423/512, 166, 555, 642, 643

[56] References Cited
UNITED STATES PATENTS

| | | | |
|---|---|---|---|
| 1,908,731 | 5/1933 | Clark | 423/242 |
| 2,713,077 | 7/1955 | Rieve | 423/244 X |
| 3,330,621 | 7/1967 | Vian-Ortuno et al. | 23/119 |

OTHER PUBLICATIONS

Chemical Abstracts: 6525, 1964.

*Primary Examiner*—Oscar R. Vertiz
*Assistant Examiner*—Gregory A. Heller
*Attorney, Agent, or Firm*—Murray Robinson; Ned L. Conley; David Alan Rose

[57] ABSTRACT

A process for the removal of sulfur oxides from gases comprising a sulfur oxide scrubbing system using hydroxide solutions such as sodium or ammonium hydroxide, a treatment system utilizing anion exchange resins in free hydroxyl form to reproduce the hydroxide solution from sulfite salts produced in the scrubbing system, a regeneration system wherein the exchange resins are regenerated by contact with, for example, lime hydrate solution, and a dewatering system wherein sludge produced in the regeneration cycle is prepared for disposal as a solid waste.

8 Claims, 1 Drawing Figure

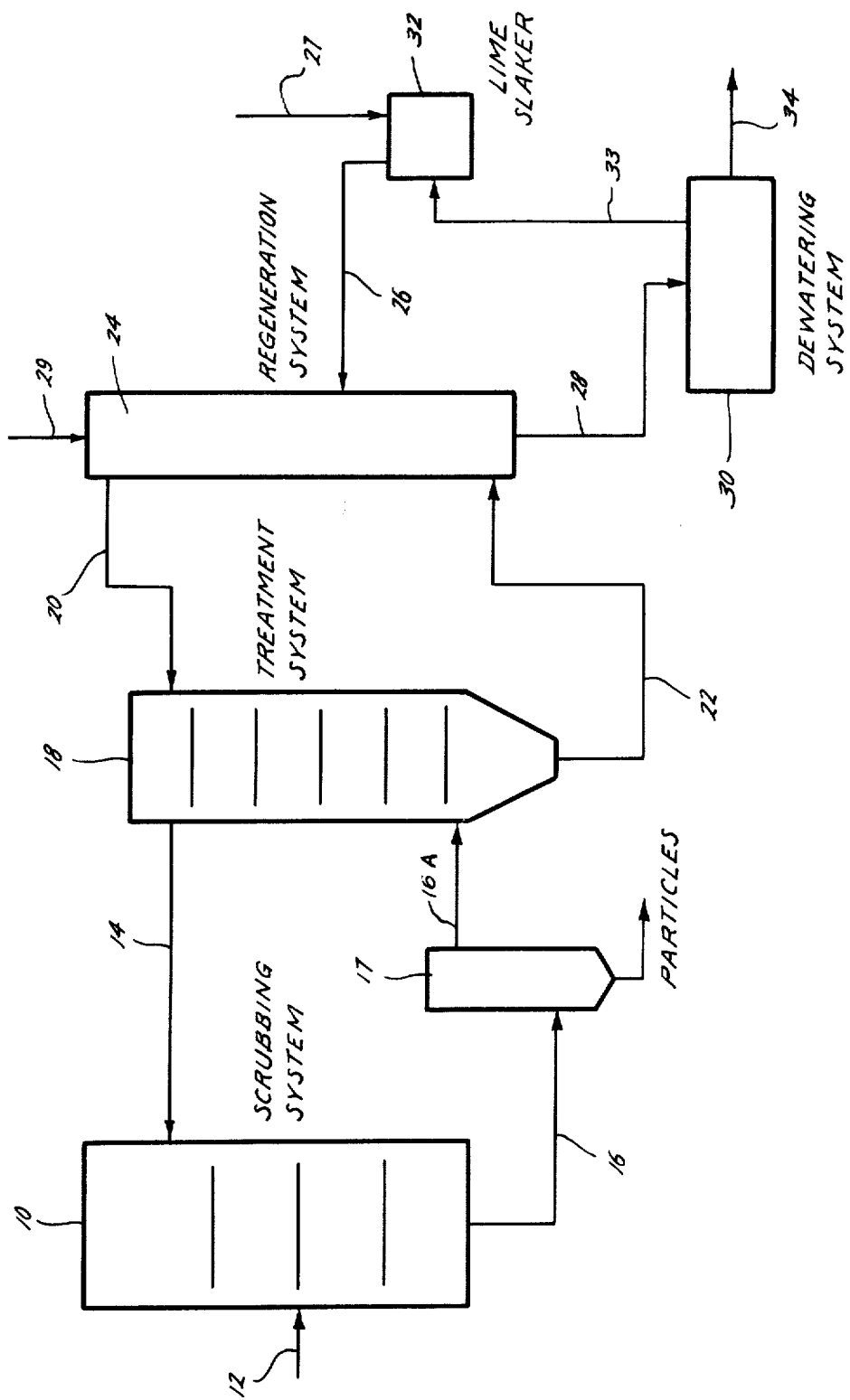

1

PROCESS FOR REMOVING SULFUR DIOXIDE FROM GASES

BACKGROUND OF THE INVENTION

1. Field of the Invention

This invention relates to the process of scrubbing sulfur oxide from gases.

2. Description of the Prior Art

Due to the concentration of sulfur in certain fuels, such as coal, combustion of the fuel oxidizes the sulfur to sulfur dioxide ($SO_2$) and other sulfur oxides which must be controlled as air pollutants. In order to control the sulfur oxide content in stack gases, it has long been a practice to scrub the gases with a lime hydrate (Ca(OH)$_2$) solution. See Chemical Engineering Progress Technical Manual, "Emission Control for Small Scale Facilities," pp. 142–150, American Institute of Chemical Engineers, 1971. During the scrubbing process, the products mainly formed are calcium sulfite ($CaSO_3$), calcium sulfate ($CaSO_4$), and water.

Due to the low solubility of calcium salts in water, the process has certain disadvantages. In order to contact the sulfur oxides with sufficient lime hydrate to result in the desired removal of sulfur oxides from the stack gases, one of two procedures must be followed: Either a large liquid circulation rate must be maintained, resulting in a great increase in the size of the scrubbing columns and/or other equipment used, or the calcium salts must be circulated in a slurry form, resulting in the scaling and plugging of the equipment. In addition, the solubility of certain calcium salts decreases as the temperature increases, which results in added difficulty in determining the optimum point of process operation.

A second process in use to control the sulfur oxide content in stack gases is that of scrubbing the gas with hydroxide solutions such as those of sodium (NaOH) or ammonium hydroxide ($NH_4OH$). Using a sodium hydroxide solution, sodium sulfite ($Na_2SO_3$), sodium bisulfite ($NaHSO_3$), sodium sulfate and water are formed during the scrubbing process. This scrubber effluent is then sent to the plant waste treatment facilities which results in certain disadvantages being associated with this process. The scrubber effluent consists of a liquid and raises water pollution problems, particularly with respect to the amount of sulfite and bisulfite present, which, in addition to contaminating the effluent with dissolved impurities, increases the biological oxygen demand. Hence, treatment of the effluent to convert it to the sulfate form is required to comply with local regulations. Even after this treatment, legal limits for the amount of dissolved salts in the liquid waste may be exceeded. In addition, the sodium hydroxide used is not recovered and must constantly be replenished.

A third process in use to control the sulfur oxide content in stack gases somewhat overcomes the objections of the second process. In addition to the process above described, the effluent sodium salt solution is sent on to a regeneration stage. The solution is contacted with lime hydrate (Ca(OH)$_2$) solution, which results in the formation of a calcium sulfite precipitate ($CaSO_3$). If oxygen is present, some calcium sulfate would also be formed. This precipitate may be dewatered, as for example by a vacuum filter, and disposed of as a solid waste. In addition, the caustic (NaOH) solution is regenerated, to be used again in the scrubbing process.

Nevertheless, a major disadvantage exists within this process. That is, the NaOH solution leaving the regeneration stage is necessarily saturated with calcium ion with which it has been in contact. At the high temperatures in the scrubber, the solubility of the calcium products decreases, so that calcium salts are precipitated in the scrubber. Hence, due to the precipitation of a significant amount of calcium salts, scaling and plugging may still occur within the scrubbing system. In addition, since the waste calcium sulfite and sulfate is saturated with NaOH, a NaOH makeup system is required.

Finally, prior art processes solely for the production of hydroxide solutions such as sodium or ammonium hydroxide should be mentioned due to the fact that a portion of the process of the invention disclosed below consists of the production of such solutions. Hence, in U.S. Pat. No. 2,606,098 Bauman discloses the production of alkali metal hydroxides by contacting anion exchange resins in the free hydroxyl form with a salt solution such as that of sodium chloride. The resin may be regenerated by contact with a lime hydrate solution. In U.S. Pat. No. 2,917,368, Juda discloses the use of weak base and strong base anion exchange resins in series. Strong base designates resins which have free hydroxyl ions. Hence, when chlorides are involved, the basicity of the resins can be calculated as the equilibrium ratio of hydroxyl to chloride in solution divided by the ratio of hydroxyl to chloride on the resin. See also U.S. Pat. No. 2,884,310 of Rosenberg et al.

SUMMARY OF THE INVENTION

The present invention overcomes the disadvantages inherent within the processes described above. The invention is in a process comprising a scrubbing system wherein a gas containing sulfur oxides is contacted with a hydroxide solution. The products formed by the reaction within the scrubbing system are water and certain soluble salts. These salts are then routed to the treatment system where they contact anion exchange resins in the free hydroxyl form (ROH), whereupon the hydroxide solution is reproduced and recycled to be used again in the scrubbing system. The spent exchange resins are routed to the regeneration system where they are contacted with another hydroxide solution, preferably a hydroxide having a cation which combines with sulfite or sulfate to form a product substantially insoluble in water. The regenerated resins (ROH) are then recycled to be used again in the treatment system. The regeneration reaction product may be dewatered and disposed of as a solid waste.

This process has a number of advantages over former processes. Compared to the process of directly scrubbing a gas containing a sulfur oxide with lime hydrate solution, the process of this invention overcomes the problems of equipment scaling and plugging caused by high concentrations of calcium salts. However, the process of this invention retains the economy of lime scrubbing due to the fact that the exhausted anion exchanger may, in its preferred embodiment, be regenerated with lime hydrate solution. In addition, the present process scrubs the gas with hydroxide solutions such as sodium hydroxide or ammonium hydroxide which have proved to be much more efficient in removing sulfur dioxide in comparison to the lime hydrate solution.

The process embodying the invention has advantages over the process of scrubbing gas containing a sulfur oxide with solutions such as those of sodium or ammonium hydroxide and merely disposing of the products. In this process it is not necessary to dispose of liquid reaction products containing, for example, sodium bisulfite (NaHSO₃) in solution, and, hence, there is no water pollution problem. Calcium sulfite (CaSO₃) or calcium sulfate, which may become the byproducts of the preferred embodiment of the invention, are disposed of as solid wastes which may be used as landfill. Calcium sulfate may be used to make various products such as wallboard. In addition, the sodium hydroxide or other hydroxide solution used in the scrubbing system is continuously regenerated rather than merely dissipated.

As shown above, rather than regenerating the hydroxide, such as sodium hydroxide, by direct contact with the lime hydrate solution, an anion exchange resin is used. The use of this resin prevents the sodium hydroxide solution from becoming saturated with lime hydrate, and, hence, eliminates the fouling and plugging problem inherent within those former processes which attempt to regenerate sodium hydroxide.

BRIEF DESCRIPTION OF THE DRAWING

The single FIGURE of the drawing is a flow diagram of one embodiment of the process of the invention.

DESCRIPTION OF THE PREFERRED EMBODIMENT

As shown in FIG. 1, a gas containing one or more sulfur oxides enters a scrubbing system 10 through line 12 and is contacted with sodium hydroxide solution or some other solution such as of ammonium hydroxide, potassium hydroxide or other alkali metal hydroxide which contains a cation which is capable of forming a water-soluble salt, entering through line 14. The use of such solutions acts to prevent the plugging and fouling normally associated with the direct lime hydrate scrubbing process. Any scrubbing system which permits contact between the two fluid feeds should be sufficient, although some systems may be more efficient than others, therefore, requiring less contact time. Hence, spraying systems, bubbling systems and other direct contact systems may be used. After reaction, the effluent by way of line 16 is sent to the treatment system 18. Particulates may be removed from the stream by means 17, which may be, for example, a filtration or centrifuge device. The effluent principally contains water and salts formed by the reactions in the scrubbing system. Assuming sodium hydroxide is used as a reactant, the effluent may contain sodium salts such as sodium sulfite ($Na_2SO_3$), sodium bisulfite ($NAHSO_3$), and sodium sulfates. Sodium sulfate would be formed from sulfur trioxide, or by the oxidation of other sodium salts such as sodium sulfite. As the effluent is not disposed of at this point, no water pollution problem is created.

The effluent upon entering the treatment system 18 contacts anion exchange resins in the free hydroxyl form (ROH) which enter the treatment system through line 20. Such a resin consists of large molecules with very porous structures. The molecules are positively charged networks containing mobile negative ions (anions) sufficient to give an electrically neutral structure. The anions may be replaced, as they only function to preserve electrical neutrality. Hence, as the sodium salts entering the treatment system 18 through line 16A contact the anion exchange resin (ROH), the sulfite or sulfate radicals ($SO_3-$, $SO_4-$) replace the hydroxyl radicals ($OH^-$) affixed to the resin. The displaced hydroxyl radicals combine with sodium ($Na^+$) to form sodium hydroxide which is recycled to the scrubbing system 10 by way of line 14. This overcomes the problem of continuously requiring hydroxide from an outside source. The exhausted resin in the sulfite ($R_2SO_3$) and-/or sulfate ($R_2SO_4$) form is discharged from the treatment system 18 through line 22.

The treatment system 18 may contain a moving bed ion exchange loop (either fluidized or packed) wherein the resin is continuously removed and replenished, as shown in U.S. Pat. No. 3,549,526, of Brown, or a fixed bed system wherein the bed is periodically taken off stream and regenerated. A fluidized bed system is preferred due to possible plugging and fouling of the fixed bed. When a fluidized bed is used the particulate removal system 17 may be omitted if the scrubber system can tolerate a buildup of particulates. Any anion exchange resin, whether it be considered a weak base or strong base resin, can be utilized if it has free hydroxyl ions, i.e., is in the free base form. Hence, with respect to strong base anion exchangers, quaternary ammonium exchangers are commercially important, including, for example, Rohm & Haas Company's Amberlite IRA-400 and IRA-402. For example, aminated derivatives of chloromethylated polystyrene may be used. Resins (polystyrene) are aminated with trimethylamine or dimethylethanolamine to give anion exchangers which are strongly basic. As a result, more alkali is required in order to convert the resin into the hydroxide form to be initially used within the process. As an example of a weak base anion exchanger, those consisting of a phenolic matrix with functional groups of primary, secondary or tertiary amines may also be used. Other weak base materials include those having tertiary amine functionality in a cross linked acrylic matrix, such as Rohm & Haas' Amberlite IRA-68, and polystyrene polyamine, such as their Amberlite IRA-45.

After the anion exchange resin has performed its function within the treatment system 18, it is routed to the regeneration system 24 by way of line 22. Here the exhausted resin may be contacted, for example, with a lime hydrate ($CA(OH)_2$) solution which enters through line 26 in order to regenerate the anion exchange resin (ROH). As substitutions for the lime hydrate solution, other hydroxide solutions may be used to accomplish regeneration of the resin. Preferably, the hydroxide solution used includes as the cation one which combines with sulfite and sulfate radicals to form a product substantially insoluble in water. Thus, other alkaline earth metal hydroxides, and hydroxides of other metals may be used. However, the lime hydrate solution is preferred because it may be prepared comparatively inexpensively by the slaking, in the lime slaker 32, of calcium oxide, entering through line 27. In addition, a mixture of powdered lime and water may be used. Hence, this process may combine the economy of the lime scrubbing process with the efficiency and simplicity of sodium hydroxide scrubbing.

Preferably the regeneration system 24 is provided with rinse water through line 29 to rinse the rising resin, thereby assisting in preventing lime from being carried over into the treatment system 18. The rinse water may be utilized as make-up water in the system.

The reaction within the regeneration system 24 results in the formation of calcium sulfite and/or sulfate ($CaSO_3$, $CaSO_4$) and the regeneration of the anion exchange resin (ROH), which may be recycled back to the treatment system 18. Calcium sulfite and sulfate and water pass out of the regeneration system through line 28. Water removed in the sludge dewatering system 30, which may consist of a centrifuge or filter apparatus, for example, may be returned to the lime slaker 32, by way of line 33. Hence, disposal may be limited to solid, water insoluble calcium precipitants, which may be used as landfill or for other industrial purposes, eliminating any water pollution problems.

The regeneration system 24 may be operated as a moving bed process (either fluidized or packed), wherein the resin continuously recirculates as in the Brown patent or as a fixed bed process wherein the resin is periodically regenerated. Advantages may exist in the use of a fluidized bed due to the increased porosity of the bed which may act to prevent the plugging thereof with precipitants.

Many variations to the above preferred embodiment will be apparent to those skilled in the art. It is impractical to show and describe all the variations included within the invention and as a result the embodiment described should be considered illustrative only, and not limiting - the scope of the invention being as broad as is defined by the appended claims. The form of the claims and the specification, including the abstract, is adopted solely for explanation and should not be considered in interpreting the scope of the invention as claimed.

I claim:
1. In the process for removing sulfur oxides from gas in which the gas enters a scrubbing system where it contacts a hydroxide solution having a cation capable of forming water-soluble salts when reacted with sulfur oxides, the improvement which comprises
   regenerating the hydroxide solution by contacting a solution of the water-soluble salt with an anion exchange resin in the free hydroxyl form whereby hydroxyl radicals of the resin are replaced by the anion of the salt and react with the cation of the salt, thereby at least partially exhausting the resin of hydroxyl ions,
   returning the regenerated hydroxide solution to the scrubbing system, and regenerating the exhausted resin by contacting it with a solution of a hydroxide having a cation which forms a salt substantially insoluble in water when reacted with the anion on the exhausted resin, whereby the hydroxyl radicals of the latter hydroxide replace the anions on the resin and the cations of the latter hydroxide react with said anions to form water-insoluble salts.

2. The process defined by claim 1, wherein the latter hydroxide is a lime hydrate solution, so that calcium salts are produced on contacting this solution with the exhausted resin, and including the steps of separating the calcium salts from the water to form a solid waste, and hydrating additional lime for the process with the separated water.

3. In the process for removing sulfur oxides from gas in which the gas enters a scrubbing system where it contacts a solution of a hydroxide of ammonia or an alkali metal, the improvement which comprises
   regenerating the hydroxide solution by contacting a solution of the water-soluble salt with an anion exchange resin in the free hydroxyl form under conditions in which hydroxyl radicals of the resin are replaced by the anion of the salt and react with the cation of the salt, thereby at least partially exhausting the resin of hydroxyl ions,
   recycling the regenerated hydroxide solution to the scrubbing system, and
   regenerating the exhausted resin by contacting it with a solution of a metal hydroxide having a cation which forms a salt substantially insoluble in water when reacted with the anion on the exhausted resin, such contacting being under conditions in which the hydroxyl radicals of the latter hydroxide replace the anions on the resin and the cations of the latter hydroxide react with said anions to form water-insoluble salts, wherein the latter hydroxide is a lime hydrate solution, and the water-insoluble salts produced are calcium salts.

4. The process defined by claim 3, and further including separating the calcium salts from water to form a solid waste,
   hydrating lime with the separated water, and
   regenerating additional resin with the hydrated lime.

5. The process defined by claim 3, and including
   washing the regenerated resin with water to remove substantially all residual cations which form water insoluble salts, and
   regenerating additional hydroxide solution with the regenerated resin.

6. In the process for removing sulfur dioxide from flue gas, in which the flue gas is contacted with a solution of sodium hydroxide in water under conditions in which water-soluble sodium salts, including sodium sulfite and sodium sulfate, are produced, the improvement which comprises
   flowing the solution of sodium salts through a bed of an anion exchange resin in free hydroxyl form under conditions in which hydroxyl radicals of the resin are replaced by sulfite and sulfate radicals from the solution, the hydroxyl radicals reacting with the sodium ions to regenerate sodium hydroxide in water solution and the resin becoming at least partially exhausted of hydroxyl radicals,
   separating the sodium hydroxide solution from the exhausted resin,
   passing a water solution of slaked lime through the bed of exhausted resin under conditions in which hydroxyl radicals of the lime replace sulfite and sulfate radicals on the resin, thereby regenerating the resin, and sulfite and sulfate radicals react with calcium ions from the lime to form substantially water-insoluble calcium salts,
   separating the regenerated resin from the water-insoluble calcium salts,
   washing the resin with water to remove residual calcium ions, whereby the regenerated resin is conditioned for additional regeneration of sodium hydroxide, and
   separating the calcium salts from water to form a solid waste.

7. In the process for removing sulfur oxides from gas in which the gas enters a scrubbing system where it contacts a solution of a hydroxide of ammonia or an alkali metal and forming a water-soluble salt solution, the improvement which comprises
   regenerating the hydroxide solution by contacting the solution of the water-soluble salt with an anion exchange resin in the free hydroxyl form under conditions in which hydroxyl radicals of the resin are replaced by the anion of the salt and react with the cation of the salt, thereby at least partially exhausting the resin of hydroxyl ions, returning the regenerated hydroxide solution to the scrubbing system, and regenerating the exhausted resin by contacting it with a solution of a hydroxide having a cation which forms a salt substantially insoluble in water when reacted with the anion on the exhausted resin, such contacting being under conditions in which the hydroxyl radicals of the latter hydroxide replace the anions on the resin and the cations of the latter hydroxide react with said anions to form water-insoluble salts.

8. In the process for removing sulfur oxides from gas in which the gas enters a scrubbing system where it contacts a solution of a hydroxide of ammonia or an alkali metal and forms a water-soluble salt solution, the improvement which comprises regenerating the hydroxide solution by contacting the solution of the water-soluble salt with an anion exchange resin in the free hydroxyl form under conditions in which hydroxyl radicals of the resin are replaced by the anion of the salt and react with the cation of the salt, returning the regenerated hydroxide solution to the scrubbing system, regenerating the resin by contacting it with a solution of a metal hydroxide having a cation which forms a salt substantially insoluble in water when reacted with the anion on the exhausted resin, such contacting being under conditions in which the hydroxyl radicals of the latter hydroxide replace the anions on the resin and the cations of the latter hydroxide react with said anions to form water-insoluble salts, washing the regenerated resin to remove substantially all residual cations which form water insoluble salts, and regenerating additional hydroxide solution with the regenerated resin.

* * * * *